(12) United States Patent
Hanaya et al.

(10) Patent No.: US 6,514,136 B1
(45) Date of Patent: Feb. 4, 2003

(54) HYDROGEN VENTILATION DUCT FOR FUEL-CELL-POWERED VEHICLE

(75) Inventors: Ryukou Hanaya, Wako (JP); Hiroyuki Hattori, Wako (JP); Tohru Ono, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/172,087

(22) Filed: Jun. 13, 2002

(30) Foreign Application Priority Data

Jul. 23, 2001 (JP) .................................. 2001-221936

(51) Int. Cl.[7] ................................................ B60H 1/30
(52) U.S. Cl. ...................................... 454/147; 180/68.3
(58) Field of Search .............................. 454/119, 147, 454/146, 151, 156; 180/68.3

(56) References Cited

U.S. PATENT DOCUMENTS

| | | | | | |
|---|---|---|---|---|---|
| 3,481,119 | A | * | 12/1969 | Mckinlay | 123/587 |
| 3,641,746 | A | * | 2/1972 | Smith et al. | 123/556 |
| 4,235,298 | A | * | 11/1980 | Sakett et al. | 123/198 E |
| 4,341,277 | A | * | 7/1982 | Adamson et al. | 280/68.1 |
| 4,778,029 | A | * | 10/1988 | Thornburgh | 180/68.3 |
| 4,831,981 | A | * | 5/1989 | Kitano | 123/198 E |
| 4,932,490 | A | * | 6/1990 | Dewey | 180/68.3 |
| 5,022,479 | A | * | 6/1991 | Kiser et al. | 180/68.3 |
| 5,157,377 | A | * | 10/1992 | Wayne | 180/69.2 |

* cited by examiner

*Primary Examiner*—Derek Boles
(74) *Attorney, Agent, or Firm*—Merchant & Gould, P.C.

(57) ABSTRACT

A hydrogen ventilation duct includes tubes for communication between a motor room as a space beneath a hood and a space inside a gutter. The gutter includes a vent communicating with the outside. Hydrogen staying in the motor room is released naturally through the tubes into the atmosphere.

3 Claims, 8 Drawing Sheets

HYDROGEN VENTILATION DUCT FOR FUEL-CELL-POWERED VEHICLE

FIELD OF THE INVENTION

This invention relates to a fuel-cell-powered vehicle and, more particularly, to a hydrogen ventilation duct for emitting hydrogen in a space underneath the hood of the vehicle in natural ventilation.

BACKGROUND OF THE INVENTION

Automobiles include fuel-cell-powered vehicles which are propelled with motors driven by electricity generated in fuel cells supplied with hydrogen and oxygen (air). Some fuel-cell vehicles have drive motors disposed in spaces beneath hoods at the front bodies (hereinafter referred to as "motor rooms"), fuel cells disposed beneath floor plates, and intake ducts extended from the fuel cells to the motor rooms.

The intake ducts take in air from the motor rooms, guiding the air to the fuel cells, and thereby providing ventilation of the fuel cells.

In a fuel-cell vehicle with such an intake duct, if the fuel cells leak hydrogen for some reason when stopping the generation of electricity, the leaked hydrogen can pass through the intake duct and flow into the motor room. Most of the hydrogen entering the motor room will flow out through the gaps between the front fenders and the hood, for example, into the atmosphere. Part of the hydrogen, however, can stay below the hood.

In order to emit hydrogen staying under the hood into the atmosphere, a ventilation duct may be provided in the hood of the fuel-cell vehicle. The ventilation duct provided in the hood allows natural ventilation to remove hydrogen staying underneath the hood.

However, the provision of the ventilation duct in the hood can cause entering of rainwater or wash water, for example, into the motor room through the ventilation duct. The entering rainwater or wash water may reach various kinds of equipment such as a motor controller provided in the motor room.

It is thus desirable to provide natural ventilation for emitting hydrogen staying under the hood while preventing the entering of rainwater or wash water into the motor room.

SUMMARY OF THE INVENTION

According to the present invention, there is provided a hydrogen ventilation duct mountable to a hood of a fuel-cell-powered vehicle, which comprises: a gutter with a substantially rectangular depression configured to be disposed between an outer panel and an inner frame which constitutes the hood; at least one tube provided in a base of the gutter so as to establish communication between a space below the hood and a space inside the gutter; a cover integrally formed with the upper end of the gutter so as to be positioned above the tube, the cover having a vent for communication between the space inside the gutter and ambient air; and at least one guide plate integrally provided to the rear surface of the cover in a position between the vent of the cover and the tube, the guide plate extending at the lower end thereof to a level lower than the upper end of the tube; wherein, hydrogen in the space below the hood is guided through the tube into the space inside the gutter, and the hydrogen in the space inside the gutter is guided from opposite sides of the guide plate to the vent.

Thus, establishing the communication between the space below the hood and the space inside the gutter using the tube and the communication between the space inside the gutter and the vent, and disposing the vent above the outer panel allow hydrogen staying under the hood to be guided through the tube into the space inside the gutter and then emitted through the vent into the atmosphere. Further, the disposition of the guide plate in the space inside the gutter between the vent and the tube results in rainwater or wash water entering the space inside the gutter from the vent guided by the guide plate to flow around the tube. The rainwater or wash water is thus guided to the gutter without entering the tube and is thus prevented from entering the motor room in which various kinds of equipment are disposed.

The guide plate is curved to protrude toward the tube, so that hydrogen entering the space inside the gutter from the tube is smoothly guided by the guide plate to the vent.

A drain pipe is connectable to the gutter, so that water collected in the gutter is:discharged through the drain pipe.

BRIEF DESCRIPTION OF THE DRAWINGS

Certain preferred.embodiments of the present invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
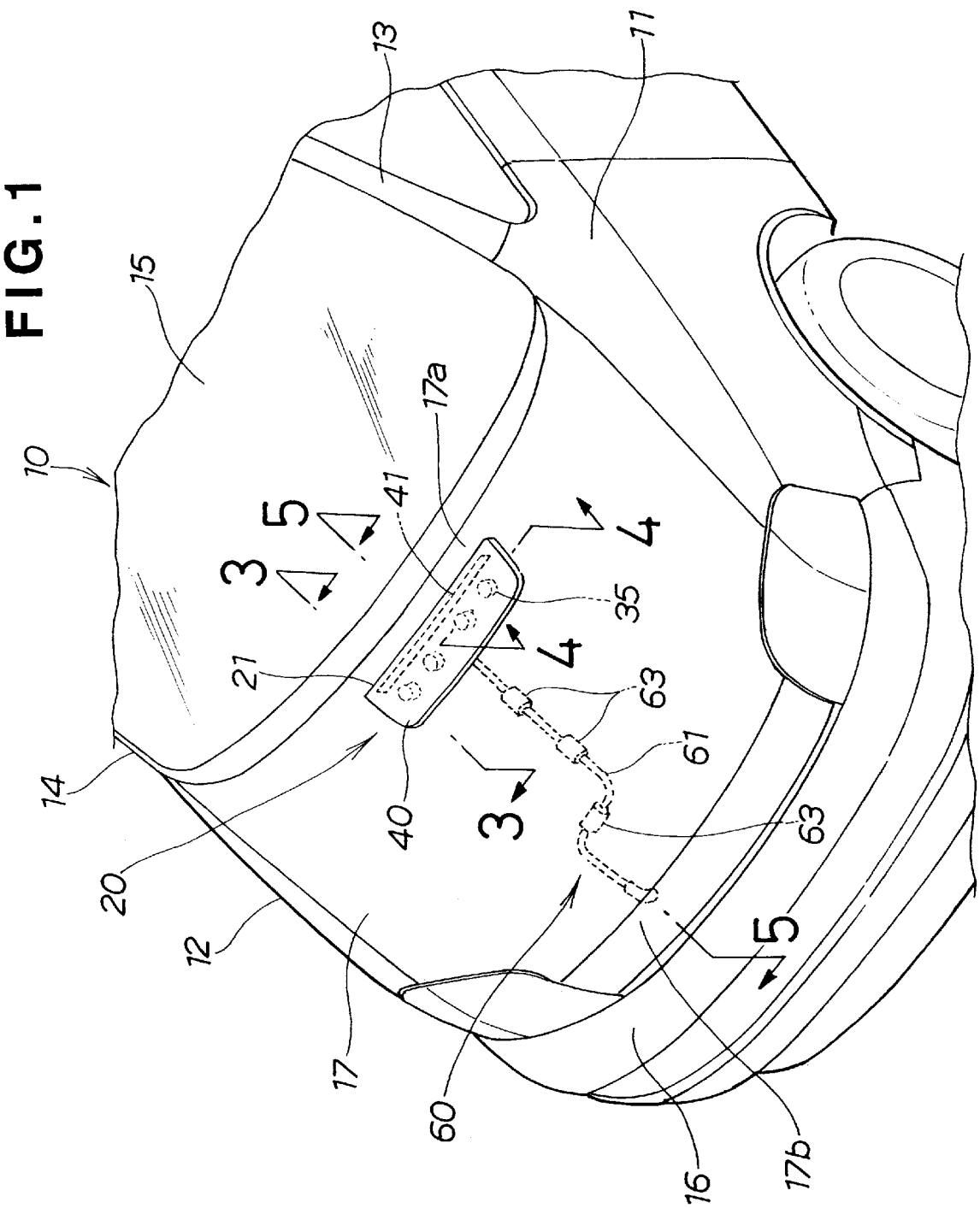
FIG. 1 is a partial perspective view of a fuel-cell-powered vehicle with a hydrogen ventilation duct according to the present invention.

Referring to FIG. 1, a fuel-cell-powered vehicle 10 has left and right front pillars 13, 14 extended respectively from the rear upper ends of left and right front fenders 11, 12, a windshield 15 extended between the left and right front pillars 13, 14, a front bumper 16 provided at the front ends of the left and right front fenders 11, 12, a hood 17 extended across the space formed by the left and right front fenders 11, 12, windshield 15 and front bumper 16, and a hydrogen ventilation duct 20 provided in the vicinity of a rear end 17a of the hood 17.

Figure 2:
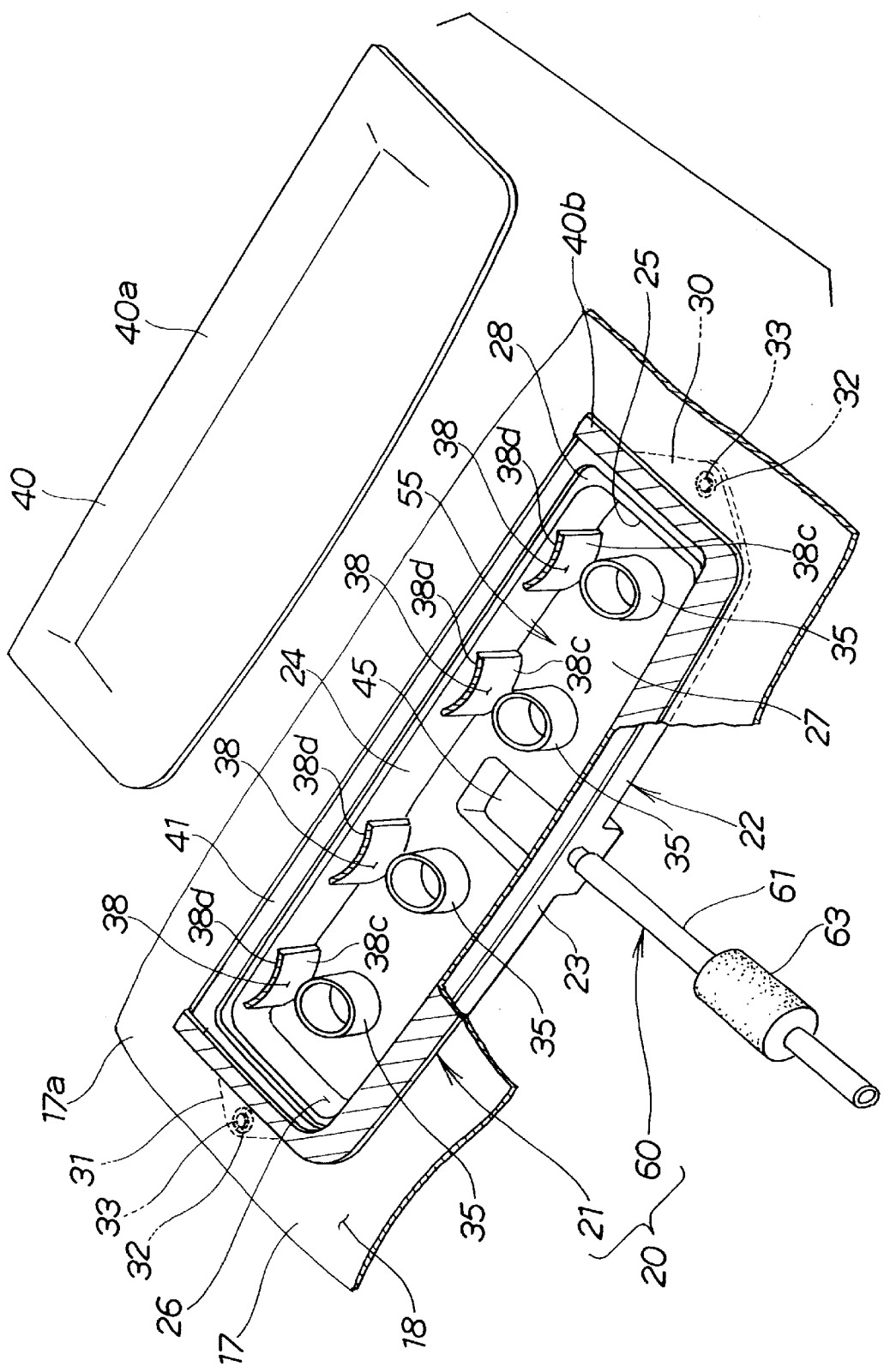
FIG. 2 is a perspective cutaway view of the hydrogen ventilation duct of the fuel-cell-powered vehicle according to the present invention.

FIG. 2 illustrates the hydrogen ventilation duct 20. The hydrogen ventilation duct 20 has a duct body 21 in a substantially rectangular shape mounted in the vicinity of the rear end 17a of the hood 17 and a drain tube (drain pipe) 60 extending along the hood 17 from the duct body 21 to the front end of the hood 17. The hydrogen ventilation duct 20 is mounted to the hood 17 with left and right brackets 30, 31 provided at the left and right ends of the duct body 21 bolted to an inner frame.

The duct body 21 has a gutter 22 formed with front, rear, left and right walls 23, 24, 25 and 26 and a base 27 to have a rectangular depression, to be mounted to the hood 17, and four tubes 35 in this embodiment provided in the base 28 of the gutter 22 at fixed intervals. Guide plates 38 are disposed between the four tubes 35 and the rear wall 24 of the gutter 22, being opposed to the tubes 35, respectively. The guide plates 38 are integrally formed with the rear surface of a cover 40. The cover 40 is integrally formed with an upper end 28 of the gutter 22. A recess 45 is formed in the middle of the base 27 of the gutter 22. The number of the tubes 35 can be determined as desired.

The cover 40 has a vent 41 at its rear end portion. The vent 41 communicates with the gutter 22. FIG. 2 shows the cover 40 divided into upper and lower covers 40a, 40b for facilitating understanding. The upper and lower covers 40a, 40b are integrally formed.

The guide plates 38 are curved so as to project toward the tubes 35 and recessed with respect to the vent 41. Thus surfaces 38c of the guide plates 38 opposite to the tubes 35 are convex surfaces and surfaces 38d opposite to the vent 41 are concave surfaces. The reason why the guide plates 38 are formed to protrude toward the tubes 35 will be described with reference to FIG. 6. The reason why the guide plates 38 are formed to be recessed with respect to the vent 41 will be described with reference to FIG. 7.

The drain tube 60 is connected to the front wall 23 of the gutter 22 so as to communicate with the recess 45. The drain tube 60 guides rainwater or wash water collected in the recess 45 to the vicinity of the front end 17b of the hood 17 (See FIG. 1) and discharges the water from the vicinity of the front end 17b of the hood 17.

A plurality of tubular elastic materials 63 (See FIG. 1) are fitted onto the drain tube 60. The tubular elastic materials 63 are disposed in the hood 17 to be held between an outer panel 18 and an inner frame 19 (See FIG. 5). The drain tube 60 is thus stably supported in the hood 17.

Figure 3:
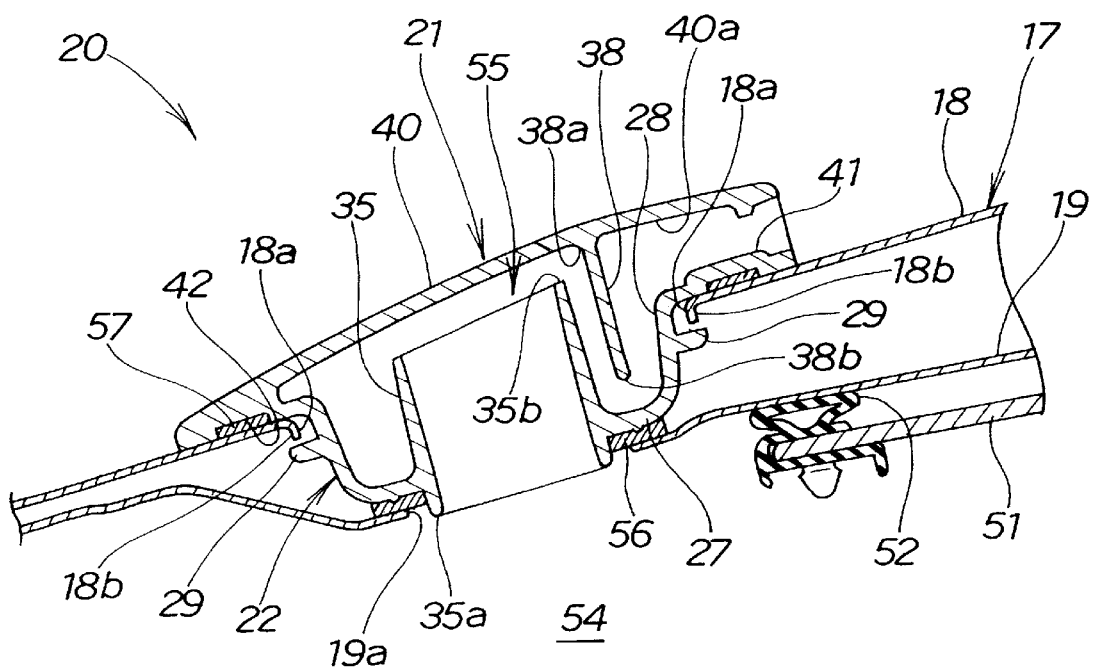
FIG. 3 is an enlarged cross-sectional view taken along line 3—3 in FIG. 1.

As shown in FIG. 3, the outer panel 18 of the hood 17 is formed with an opening 18a in a substantially rectangular shape for fitting the gutter 22 therein. The inner frame 19 is formed with four circular openings, 19a in a direction perpendicular to the Figure sheet for inserting lower ends 35a of the tubes 35 therein. A hood insulator 51 is disposed below the inner frame 19. A hood rubber seal 52 is attached to the hood insulator 51. The hood rubber seal 52 is press-contacted with the rear surface of the inner frame 19.

The gutter 22 with a rectangular depression is disposed between the outer panel 18 and the inner frame 19 of the hood 17. An opening in the upper end 28 of the gutter 22 is positioned at the opening 18a of the outer panel 18. The base 27 of the gutter 22 is positioned on the upper surface of the inner frame 19. The tubes 35 are provided in the base 27 in a direction crossing the sheet surface at predetermined intervals. The lower ends 35a of the tubes 35 are respectively inserted into the openings 19a of the inner frame 19 so that the tubes 35 communicates with a space beneath the hood 17 (motor room) 54 and a space 55 inside the gutter 22. Hood duct seals 56 are provided around the tubes 35. The hood duct seals 56 abut against the inner frame 19 so that the duct body 21 blocks the openings 19a of the inner frame 19.

The cover 40 positioned above the tubes 35 is integrally formed with the upper end 28 of the gutter 22. A circular groove 42 is formed in a rear peripheral surface of the cover 40. A hood duct trim 57 is held in the circular groove 42. The hood duct trim 57 abuts against the surface of the outer panel 18 so that the cover 40 blocks the opening 18a of the outer panel 18.

The cover 40 has the vent 41 communicating with the space 55 inside the gutter 22. The vent 41 is positioned above the outer panel 18. The guide plates 38 are disposed in the space 55 inside the gutter 22 between the vent 41 of the cover 40 and the tubes 35. Upper ends 38a of the guide plate 38 are integrally formed with the rear surface 40a of the cover 40. Lower ends 38b of the guide plates 38 extend downward to a level lower than the upper ends 35b of tubes 35.

The cover 40 positioned above the tubes 35 inclines upward from the front to the rear. Thus hydrogen is guided along the rear surface 40a of the cover 40 toward the vent 41 rearward.

The upper ends 35b of the tubes 35 incline upward to the rear in agreement with the rear surface 40a of the cover 40. This allows the space between the upper ends 35b of the tubes 35 and the rear surface 40a of the cover 40 to be set small. Thus rainwater or wash water is securely prevented from entering from the upper ends 35b of the tubes 35.

The front wall 23 and the rear wall 24 of the gutter 22 have overhangs 29, 29 protruding forward and backward, respectively. The opening 18a of the outer panel 18 is formed in a space between the overhangs 29, 29 and the cover 40, and a bend 18b bent downward is interposed therebetween.

Figure 4:
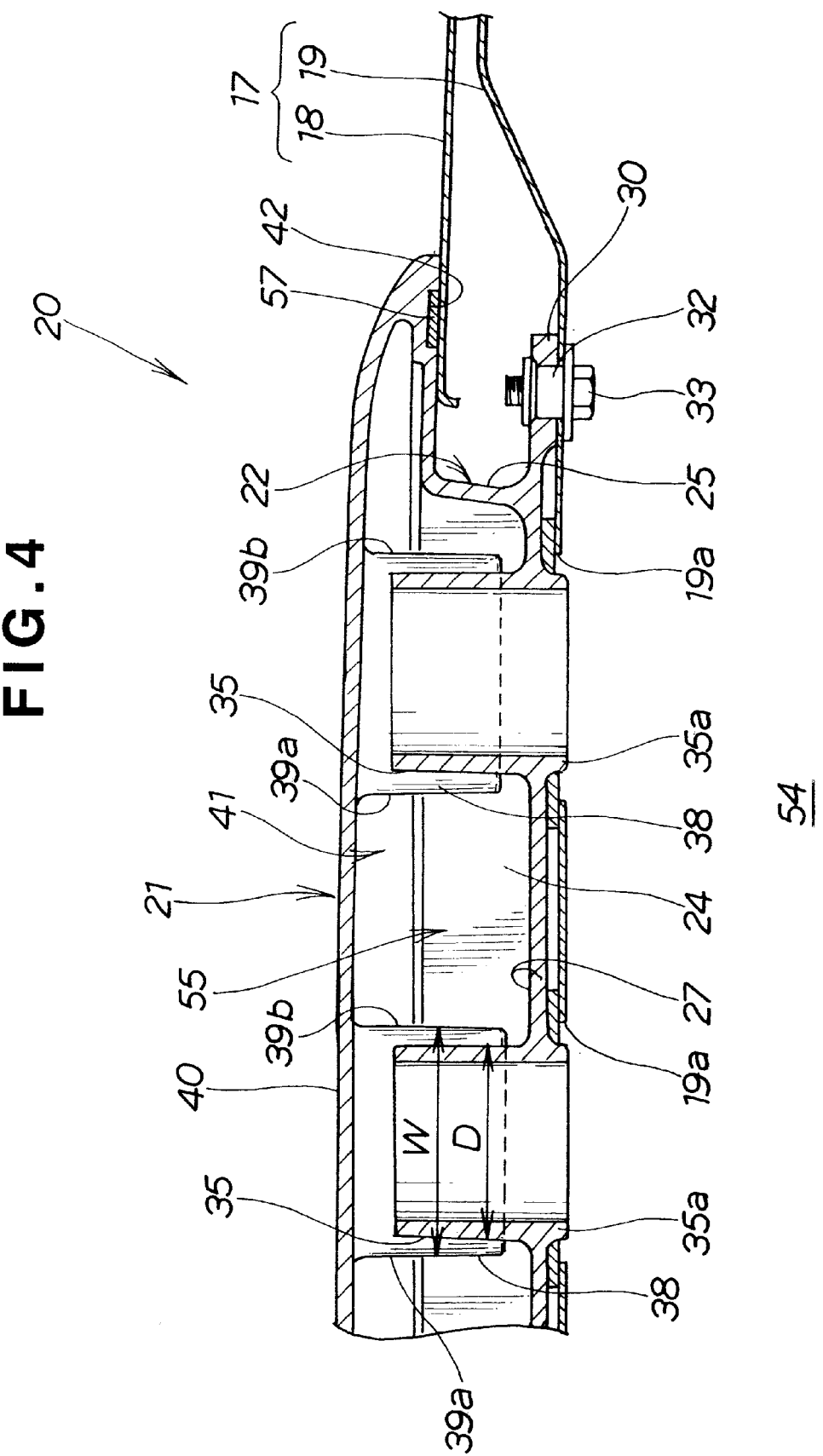
FIG. 4 is an enlarged cross-sectional view taken along line 4—4 in FIG. 1.

Referring to FIG. 4, the duct body 21 has the left bracket 30 extending to the left (to the right in the figure) provided at the lower end of the left wall 25 of the gutter 22. The left bracket 30 has a female thread member 32. The duct body 21 also has, as shown in FIG. 2, the right bracket 31 extending to the right provided at the lower end of the right wall 26 of the gutter 22. The right bracket 31 has a female thread member 32. Bolts 33 are screwed in the left and right female thread members 32, 32, respectively, so that the left and right brackets 30, 31 are mounted to the inner frame 19.

The tubes 35 are integrally formed with the base 27 of the gutter 22 at fixed intervals. The lower ends 35a of the tubes 35 are respectively inserted into the openings 19a of the inner frame 19 so that the base 27 of the gutter 22 blocks the openings 19a of the inner frame 19.

The width W between opposite sides 39a, 39a of the guide plates 38 is set greater than the outside diameter D of the tubes 35 so that the guide plates 38 cover the tubes 35.

Figure 5:
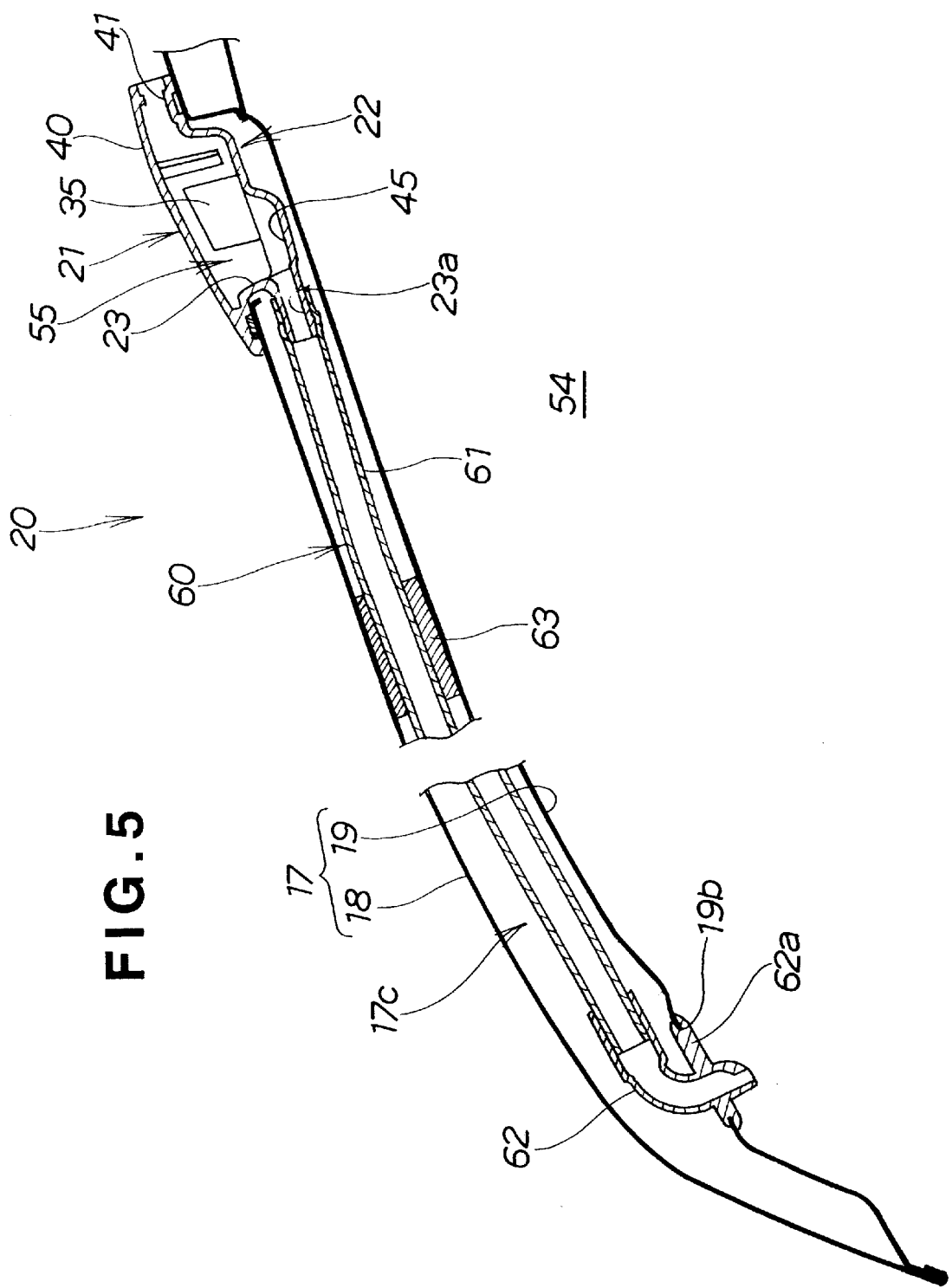
FIG. 5 is an enlarged cross-sectional view taken along line 5—5 in FIG. 1.

FIG. 5 illustrates a drain nozzle 23a formed at the front wall 23 of the gutter 22 and the drain tube 60 connected to the drain nozzle 23a. Specifically, the rear end of a tube body 61 of the drain tube 60 is fitted onto the drain nozzle 23a and a front nozzle 62 is fitted onto the tube body 61. The tubular elastic materials 63 are fitted onto the tube body 61 as shown in FIG. 1 to be held between the outer panel 18 and the inner frame 19. A flange 62a of the front nozzle 62 is fitted to an opening 19b of the inner frame 19. Thus the tube body 61 is stably disposed in a space 17c between the outer panel 18 and the inner frame 19. The front nozzle 62 communicates with the recess 45 of the gutter 22 via the tube body 61 and the drain nozzle 23. Rainwater or wash water collected in the recess 45 of the gutter 22 is thus discharged from the front nozzle 62 through the tube body 61.

Figure 6A:
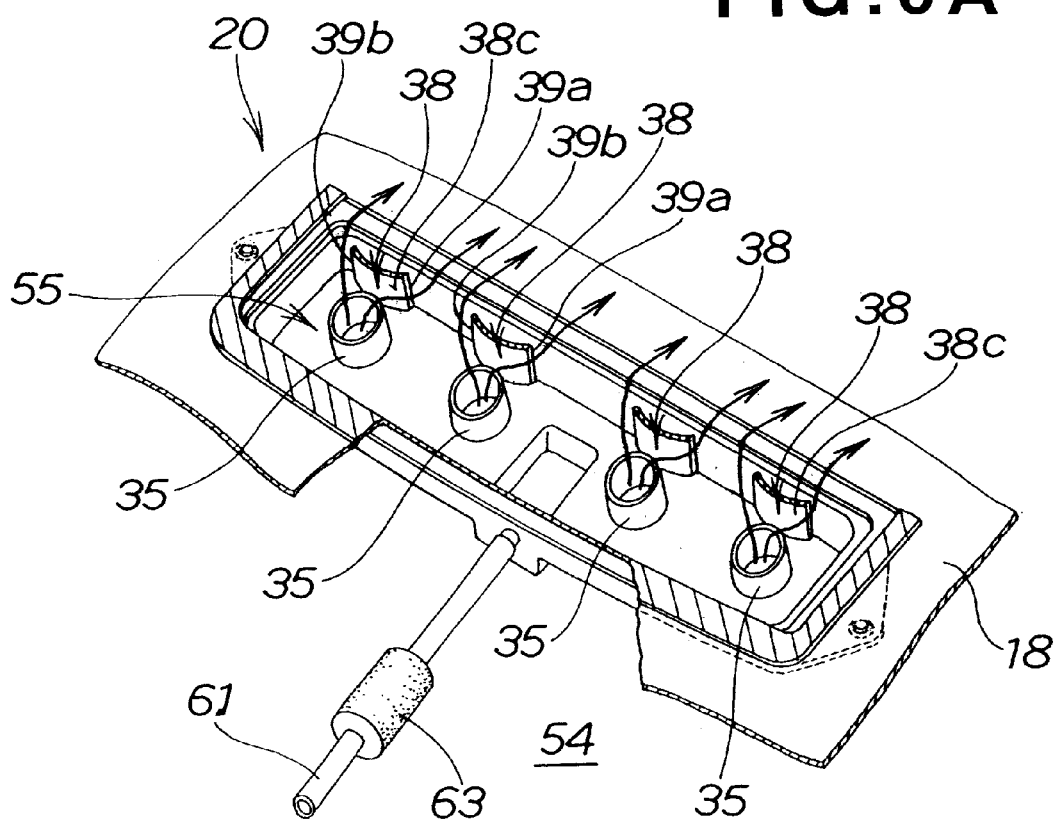
FIGS. 6A and 6B are diagrams illustrating the flows of hydrogen exiting through the hydrogen ventilation duct of the present invention.
Figure 6B:
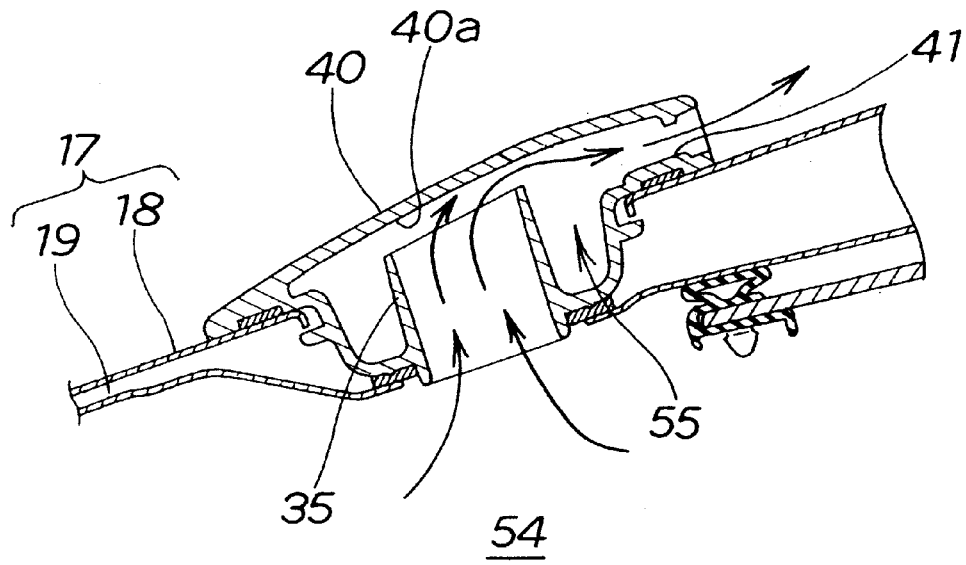

FIGS. 6A and 6B illustrate hydrogen let out through the hydrogen ventilation duct 20.

In FIG. 6A, hydrogen, if leaked from fuel cells for some reason when the fuel cells stop generating electricity, can enter motor room 54 through an intake duct. The hydrogen entering the motor room 54 flows into the space 55 inside the gutter 22 through the tubes 35 of the hydrogen ventilation duct 20. The hydrogen then circumvents the guide plates 38 and flows from the opposite sides 39a, 39a of the guide plates 38 as shown by arrows. As described with FIG. 2, the guide plates 38 are curved to protrude toward the tubes 35, having the convex surfaces 38c. The hydrogen entering the space 55 inside the gutter 22 from the tubes 35 is thus guided smoothly along the convex surfaces 38c of the guide plates 38 to the opposite sides 39a, 39a as shown by arrows.

In FIG. 6B, the hydrogen circumventing the guide plates 38 (See FIG. 6A) flows along the rear surface 40a of the cover 40 toward the vent 41 and is let out through the vent 41 into the atmosphere. Specifically, the upward inclination of the cover 40 to the rear smoothly guides the hydrogen along the rear surface 40a of the cover 40 to the vent 41. The smooth guidance of the hydrogen in the space 55 inside the gutter 22 to the vent 41 and the efficient emission of the hydrogen to the atmosphere as shown by arrows provide natural ventilation of the motor room 54 to eliminate the hydrogen.

Next, a case of entering of rainwater or wash water from the vent 41 of the hydrogen ventilation duct 20 will be described with reference to FIGS. 7A to 8.

Figure 7A:
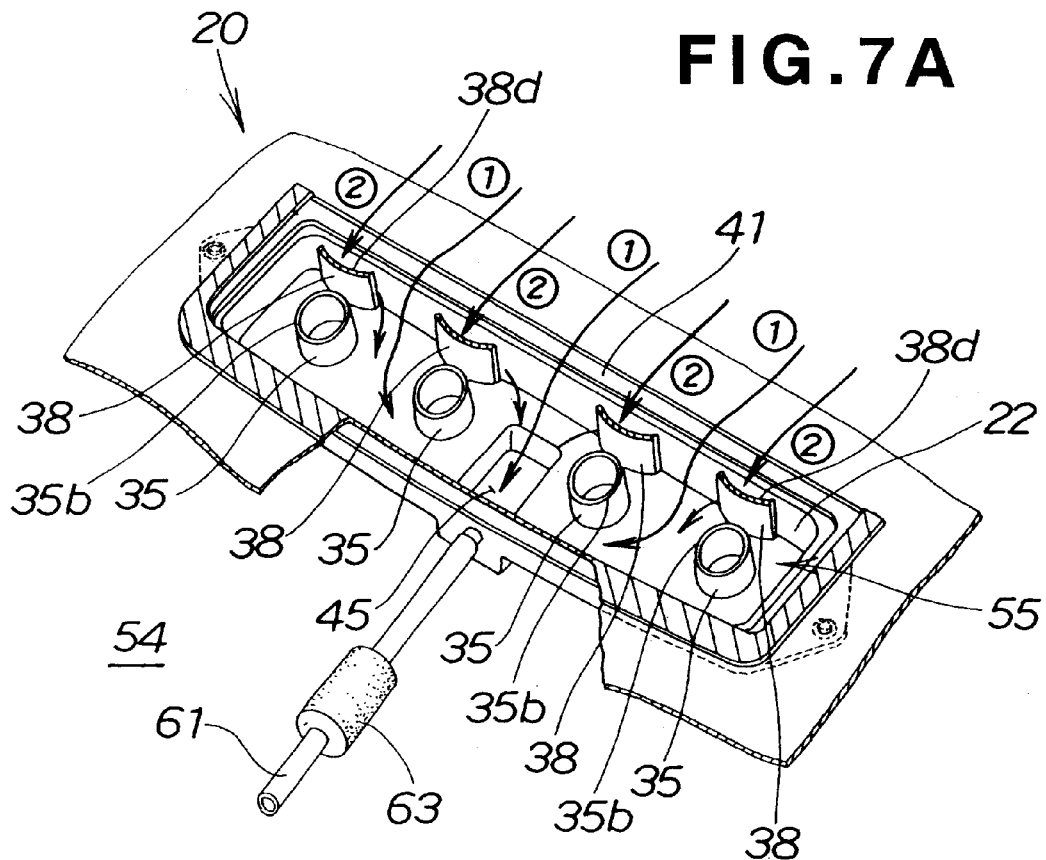
FIGS. 7A and 7B are diagrams illustrating the flows of water entering the hydrogen ventilation duct of the present invention.

In FIG. 7A, rainwater or wash water, when entering from the vent 41 of the hydrogen ventilation duct 20 as shown by arrows ①, flows into the space 55 inside the gutter 22. Rainwater or wash water entering as shown by arrows ② is intercepted by the guide plates 38.

Figure 7B:
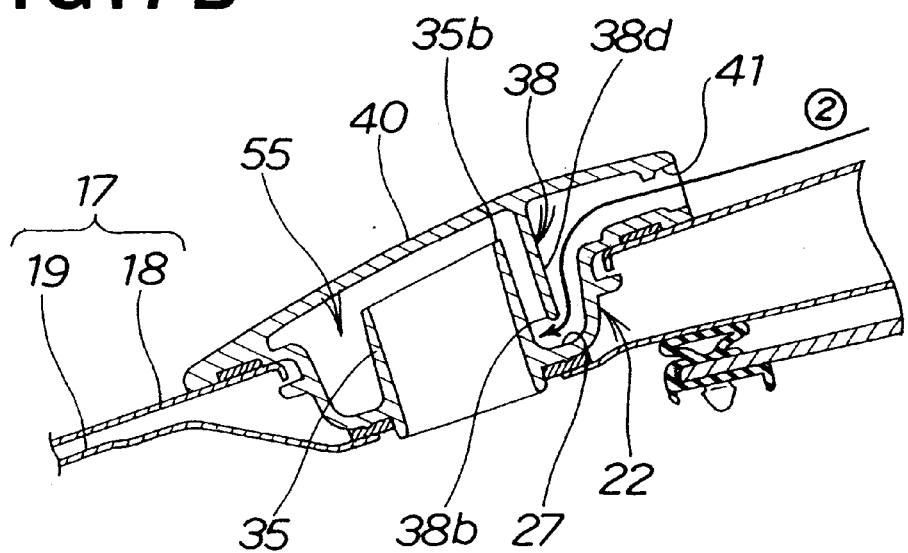

As shown in FIG. 7B, the rainwater or wash water intercepted by the guide plates 38 is guided along the guide plates 38, flowing toward the base 27 of the gutter 22, and then flows through the gaps between the lower ends 28b of the guide plates 38 and the base 27 of the gutter 22 toward the recess 45 as shown in FIG. 7A. The guide plates 38 are curved to protrude toward the tubes 35 as shown in FIG. 7A with the surfaces 38d opposite to the vent 41 recessed. The rainwater or wash water coming in through the vent 41 toward the guide plates 38 as shown by arrows ② is thus collected in the middle of the guide plates 38. This securely prevents rainwater or wash water from going around the opposite ends 39a, 39b of the guide plates 38 and entering the tubes 35 from the upper ends 35b of the tubes 35.

The rainwater or wash water entering as shown by arrows ② flows along the guide plates 38 toward the base 27 of the gutter 22 as described above, being prevented from entering the tubes 35 from the upper ends 35b thereof. This prevents rainwater or wash water from entering the motor room 54 from the upper ends 35b of the tubes 35 through the tubes 35 and reaching various kinds of equipment inside the motor room 54.

Figure 8:
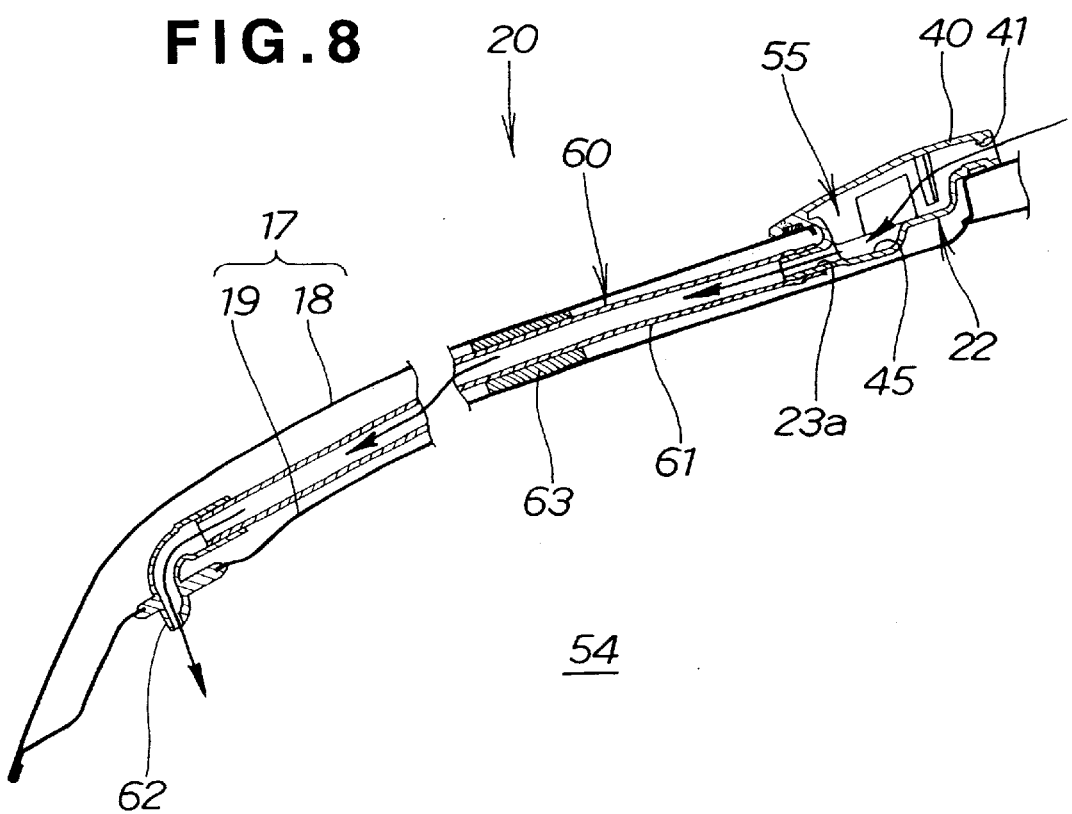
FIG. 8 is a diagram illustrating the drain of water entering the hydrogen ventilation duct of the present invention.

As shown in FIG. 8, rainwater or wash water flowing into the recess 45 of the gutter 22 flows through the drain nozzle 23a into the tube body 61. The rainwater or wash water flowing into the tube body 61 flows through the tube body 61 to the front nozzle 62 and is discharged from the front nozzle 62. This prevents water collected in the recess 45 of the gutter 22 from reaching various kinds of equipment inside the motor room 54.

The above embodiment has been described with the guide plates 38 curved to protrude toward the tubes 35. The shape of the guide plates 38 is not limited to the curved one. The guide plates 38 may be formed in a substantially V shape, for example, to provide similar effects.

The above embodiment has been described with the hydrogen ventilation duct 20 mounted in the vicinity of the rear end 17a of the hood 17. The present invention is not limited thereto. The mounting position of the hydrogen ventilation duct 20 to the hood 17 is selectable in accordance with the shape of the fuel-cell vehicle 10.

The above embodiment has been described with the lower ends 35a of the tubes 35 inserted in the openings 19a of the inner frame 19. The present invention is not limited thereto. The lower ends 35a of the tubes 35 may be opposed to the openings 19a of the inner frame 19 without being inserted therein.

The present disclosure relates to the subject matter of Japanese Patent Application No. 2001-221936, filed Jul. 23, 2001, the disclosure of which is incorporated herein by reference in its entirety.

What is claimed is:

1. A hydrogen ventilation duct mountable to a hood of a fuel-cell-powered vehicle, comprising:
    a gutter with a depression configured to be disposed between an outer panel and an inner frame which constitute said hood;
    at least one tube provided in a base of said gutter so as to establish communication between a space below said hood and a space inside said gutter;
    a cover integrally formed with the upper end of said gutter so as to be positioned above said tube, said cover having a vent for communication between said space inside said gutter and ambient air; and
    at least one guide plate integrally provided to the rear surface of said cover in a position between said vent of said cover and said tube, said guide plate extending at the lower end thereof to a level lower than the upper end of said tube; wherein,
        hydrogen in said space below said hood is guided through said tube into said space inside said gutter, and the hydrogen in said space inside said gutter is guided from opposite sides of said guide plate to said vent.

2. A ventilation duct as set forth in claim 1, wherein said guide plate is curved to protrude toward said tube.

3. A ventilation duct as set forth in claim 1, wherein a drain pipe is connectable to said gutter so as to discharge water collected in said gutter through said drain pipe.

* * * * *